United States Patent [19]

Lowe et al.

[11] Patent Number: 4,795,169
[45] Date of Patent: Jan. 3, 1989

[54] RADIALLY STABLE MECHANICAL FACE SEALS

[75] Inventors: David J. Lowe, Maidenhead; John Kemp, Farnham Common, both of England

[73] Assignee: Crane Packing Limited, England

[21] Appl. No.: 68,661

[22] Filed: Jul. 1, 1987

[30] Foreign Application Priority Data

Jul. 5, 1986 [GB] United Kingdom ............... 8616459

[51] Int. Cl.⁴ .............................................. F16J 15/38
[52] U.S. Cl. ................................ 277/87; 277/93 SD; 277/65
[58] Field of Search .................... 277/65, 81 R, 82, 84, 277/85–87, 93 R, 93 S D

[56] References Cited

U.S. PATENT DOCUMENTS

| | | | |
|---|---|---|---|
| 3,117,794 | 1/1964 | Wachal | 277/92 |
| 3,502,343 | 3/1970 | Pustelnik | 277/84 X |
| 3,675,933 | 7/1972 | Nappe | 277/87 X |
| 3,807,742 | 4/1974 | Hershey | 277/87 |
| 3,918,724 | 11/1975 | Alley | 277/84 X |
| 4,415,165 | 11/1983 | Martini | 277/65 X |

FOREIGN PATENT DOCUMENTS 699001 12/1964 Canada ........................ 277/93 R

*Primary Examiner*—Robert S. Ward
*Attorney, Agent, or Firm*—Davis, Bujold & Streck

[57] ABSTRACT

A mechanical face seal has a first seal face member mounted in fixed rotational and radial relationship to one component and sealed with respect thereto; abutment means mounted in fixed rotational and radial relationship to a second component and sealed with respect thereto; and a second seal face member interposed between the first seal face member and the abutment means. Spring means is arranged to apply an axial load between the first and second seal face members, said second seal face member having opposed faces, one of said faces being maintained in sealing engagement with a corresponding face on the first seal face member under the axial load applied by the spring means and the other face being sealed with respect to a corresponding face on said abutment means. Means is provided to interconnect said second seal face member rotationally with respect to said abutment means while permitting limited radial movement therebetween and one of said faces of the second seal face member and the corresponding face of the first seal face member or abutment means is inclined to the axis of the seal, so as to impose a radial load on the second face member. Two such seal assemblies may be provided co-axially of one another to provide a double seal.

17 Claims, 4 Drawing Sheets

RADIALLY STABLE MECHANICAL FACE SEALS

BACKGROUND TO THE INVENTION

The present invention relates to mechanical face seals.

SUMMARY OF THE INVENTION

According to one aspect of the present invention, a mechanical face seal for providing a fluid tight seal between a pair of relatively rotatable components comprises; a first seal face member mounted in fixed rotational and radial relationship to one of said components and is sealed with respect thereto; abutment means mounted in fixed rotational and radial relationship to the other component and is sealed with respect thereto; a second seal face member interposed between the first seal face member and the abutment means; and spring means arranged to apply an axial load between the first and second seal face members; said second seal face member having opposed faces, one of said faces being inclined to the axis of the seal and being maintained in sealing engagement with an oppositely inclined face on the first seal face member under the axial load applied by the spring means so as to impose a radial load on the second seal face member; and the other face being sealed with respect to a corresponding face on said abutment means, means being provided to interconnect said second seal face member rotationally with respect to said abutment means while permitting limited radial movement of the second seal face member relative to the abutment means.

With this seal assembly, the radial load applied to the second seal face member will centralise the second seal face member to provide radial stability, centralisation of the second seal face member being permitted by the limited radial movement allowed between the second seal face member and abutment means. Furthermore, if the face on the second seal face member is inclined outwardly, the radial force applied to the second seal face member will be inwardly and the second seal face member may be formed from several arcuate pieces, these pieces being held together by the radial force. This split seal face configuration, will permit removal and replacement of the seal face member without the need to disassemble the relatively rotatable components, thus facilitating maintenance of the seal.

According to a further aspect, the present invention also provides a double seal comprising a pair of seal assemblies as described above, arranged concentrically of one another. With double seals of this type, the concentric seal face members define an annular chamber and fluid leaking into this chamber past the sealing faces, may be removed by a drain. Alternatively, a barrier liquid may be introduced into the chamber, this liquid also serving to lubricate and cool the sealing faces.

BRIEF DESCRIPTION OF THE DRAWINGS

Several embodiments of the invention are now described, by way of example only, with reference to the accompanying drawings, in which.

DESCRIPTION OF PREFERRED EMBODIMENTS

Figure 1:
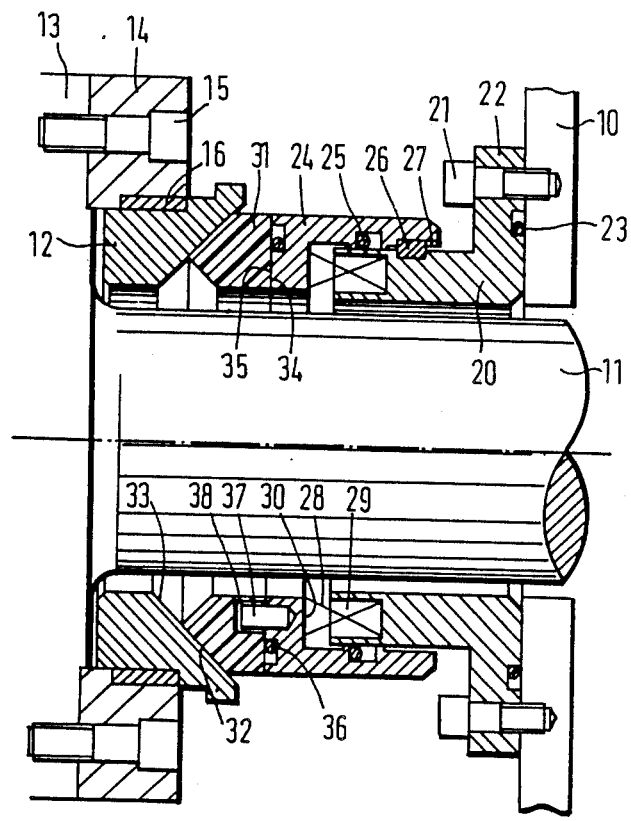
FIG. 1 is a sectional elevation of a seal formed in accordance with the present invention.

FIG. 1 illustrates a mechanical face seal which provides a seal between a housing 10 and a rotatable shaft 11 at the point where the shaft 11 penetrates the housing 10. A first annular seal face member of seat 12 is supported within a locating ring 14, the location ring 14 being secured to a flange 13 on the shaft 11 by means of a plurality of angularly spaced bolts 15. A sealing strip 16 positioned between the seat 12 and the location ring 14 provides a seal between the seat 12 and shaft 11.

A tubular support member 20 is mounted on the housing 10 by means of a plurality of angularly spaced bolts 21 passing through a flange portion 22, so that it extends coaxially of the shaft 11 towards the seat 12. The support member 20 is sealed with respect to the housing 10 by means of an elastomeric O-ring 23.

An abutment ring 24 is slidingly located on the external diameter of the tubular portion of support member 20 and is sealed with respect thereto by means of an elastomeric O-ring 25. A key 26 located on the outer diameter of the tubular portion of the support member 20 engages in an axially extending key-way 27 in the abutment ring 24 to secure the abutment ring 24 rotationally with respect to the support member 20, whilst permitting axial movement of the abutment ring 24. A plurality of compression springs 28 are located in angularly spaced closed bores 29 in the end of support member 20 and act against a shoulder portion 30 on the internal diameter of abutment ring 24, to urge the abutment ring 24 towards the seat 12.

A second seal face member 31, is interposed between the abutment ring 24 and the seat 12. This second seal face member 31 has a frustroconical sealing face 32 which is maintained in sealing engagement with a corresponding frustroconical sealing face 33 on the seat 12, by means of the axial load applied by the springs 28. At the opposite end of seal face member 31, a radial face 34 abuts against the radial end face 35 of the abutment ring 24 and is sealed with respect thereto by means of an elastomeric O-ring 26. A plurality of angularly spaced drive pins 37 engage in bores in the end of abutment ring 24 and extend axially to engage in radially extended bores 38 in the seal face member 31, so that they will transmit rotational movement from the abutment ring 24 to the seal face member 31, while permitting limited radial movement. This limited radial movement permits the seal face member 31 to centralise itself with respect to the seal 12, under the influence of the radial force applied to the seal face member 31, resulting from reaction of the axial force applied by the springs 28, at the frustroconical faces 32 and 33.

Figure 2:
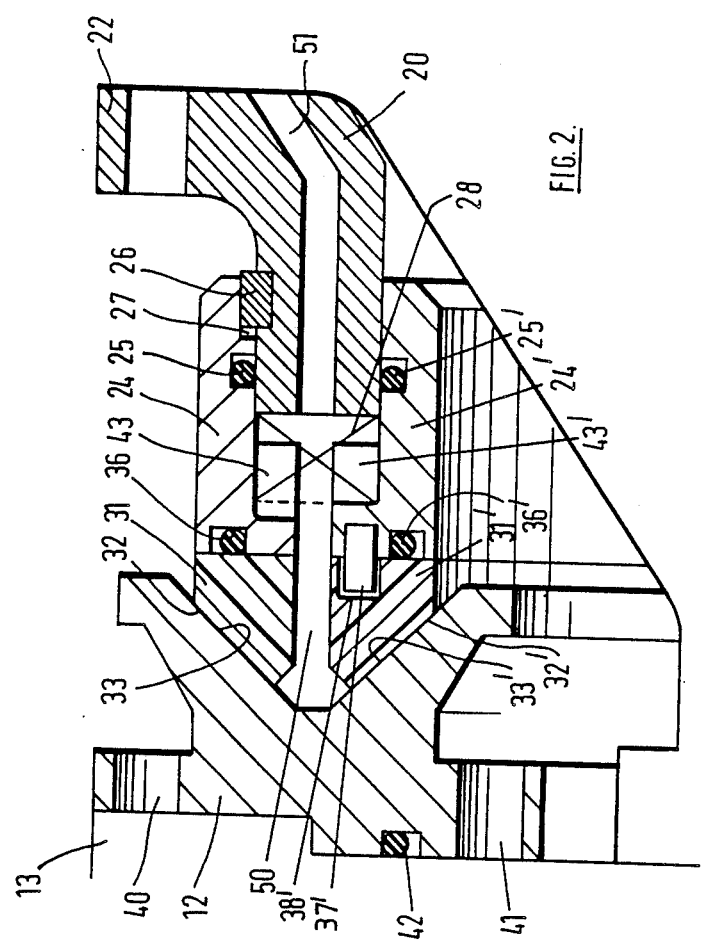
FIG. 2 is a part sectional elevation of a double seal based on the seal illustrated in FIG. 1.

FIG. 2 illustrates a double seal based on the seal illustrated in FIG. 1. The same reference numerals have been used for similar components.

In this double seal, the seat 12 defines a pair of oppositely inclined frustroconical sealing faces 33 and 33'. The seat 12 in adapted to be mounted onto the flange 13 of a shaft by means of angularly spaced bolts passing through holes 40 and 41. The seat 12 is sealed to the shaft flange 13 by means of an elastomeric O-ring 42.

As described above, an abutment ring 24 is mounted on the external diameter of the tubular portion of support member 20 and urges a frustroconical sealing face 32 of a seal face member 31 into sealing engagement with face 33 of seat 12. In similar manner, a second abutment ring 24' is mounted coaxially of abutment ring 24 in sliding engagement with the internal diameter of the tubular portion of support member 20. This second abutment ring 24' urges the frustroconical sealing face 32' of a further seal face member 31' into sealing engagement with the second face 33' on the seat 12.

A plurality of angularly spaced axially extending grooves 43 and 43' of part circular cross section are provided in the inner surface of ring 24 and the outer surface of ring 24' respectively, so that when aligned, the grooves 43 and 43' will provide locations for the compression springs 28. The grooves 43 and 43' open to the surfaces of the rings 24 and 24' that engage the support member 20 and are closed at their other ends, so that the springs 28 may act between the end of support member 20 and the closed end of the grooves 43 and 43', to urge the rings 24 and 24' axially towards the seat 12. Alternate grooves 43 and ring 24 and alternate grooves 43' in ring 24' are of increased length relative to the intermediate grooves, and the shorter grooves 43 on ring 24 are aligned with the longer grooves 43' on ring 24', so that adjacent springs 28 will act between the support member 20 and either the end of groove 43 on ring 24 or the end of groove 43' on ring 24'. In this manner, rings 24 and 24' will be independently loaded towards the seat 12.

An annular chamber 50 is defined between the seal face members 31 and 31'. One or more passages 51 may be provided through the tubular portion of support member 20 to communicate with the chamber 50. Where, for example, the seal is to be used to separate one service on the outside of ring 24 and member 31, from another service on the inside of ring 24' and member 31', the passage 51 may serve to remove any fluid which leaks past the sealing faces 32 and 33 or 32' and 33', so that the fluid in one service will not be contaminated by the fluid in the other service, even if some leakage does occur across the sealing faces. Alternatively, if for example the seal is to be used to seal a potentially hazardous gas or vapour from atmosphere, the chamber 50 may be filled with a barrier liquid, which will also serve to lubricate and cool the sealing faces.

Figure 3:
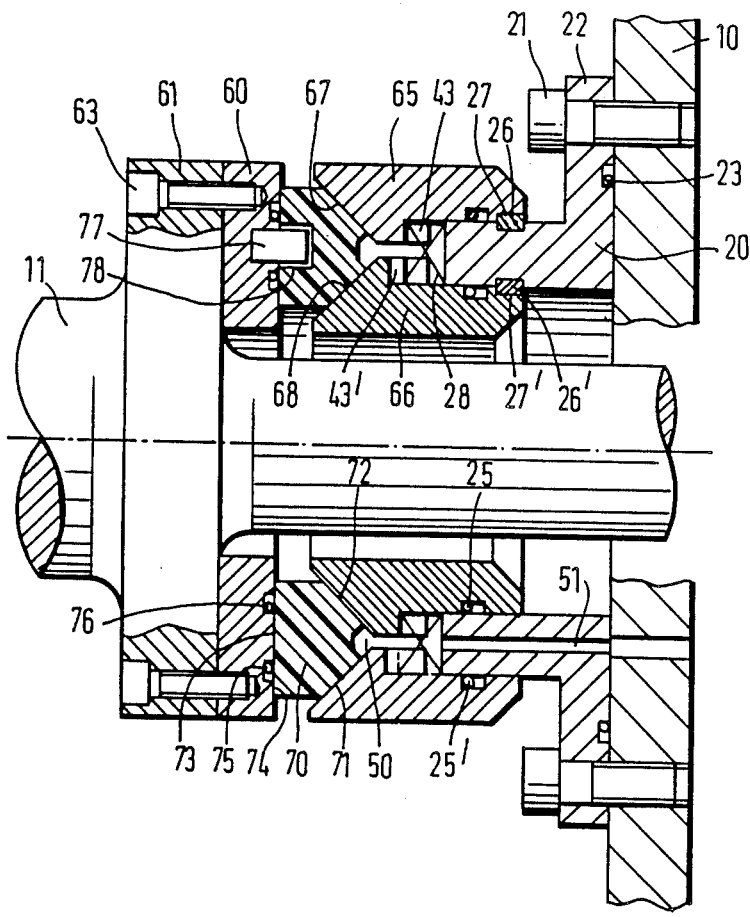
FIG. 3 is a sectional elevation of a modification of the double seal illustrated in FIG. 2.

In the double seal illustrated in FIG. 3, an abutment ring 60 is bolted to the flange 61 on a shaft 11, by means of a plurality of angularly spaced bolts 63.

A tubular support member 20 is secured to a housing 10 in the manner described above. A pair of concentric seal face members 65 and 66 are slidingly located on the external and internal diameters of the tubular portion of support member 20 and are provided with spring means 28 to independently urge them axially towards the abutment ring 60, in similar manner to the abutment rings 24 and 24' described with reference to FIG. 2. The seal face members 65 and 66 are provided with oppositely inclined frustroconical sealing faces 67 and 68 respectively.

A seal face member 70 is interposed between the abutment ring 60 and the seal face members 65 and 66, correspondingly inclined frustroconical sealing faces 71 and 72 on the seal face member 70 being maintained in sealing engagement with the sealing faces 67 and 68 respectively, on the seal face members 65 and 66. A radial face 73 at the other end of seal face member 70 engages a radial face 74 on abutment ring 60 and is sealed thereto by means of a pair of elastomeric O-rings 75 and 76. A plurality of drive pins 77 are located in axial bores in the abutment ring 60 and extend axially to engage in radially extended bores 78 in the seal face member 70, so that rotational movement of the shaft 11 will be transmitted to the seal face member 70, but the seal face member 70 will be permitted limited radial movement relative to the abutment ring 60. The seal face member 70 may thus centralise itself between the sealing faces 67 and 68 of the seal face members 65 and 66, as a result of the radial loads applied thereto by reaction of the axial load applied by springs 28 at the frustroconical sealing faces 67 and 71, and 68 and 72.

As with the embodiment described with reference to FIG. 2, a passage 51 may be provided to the annular chamber 50 defined between the seal face members 65 and 66 to permit removal of fluid leaking past the sealing faces or the introduction of a barrier fluid into the cavity.

Figure 4:
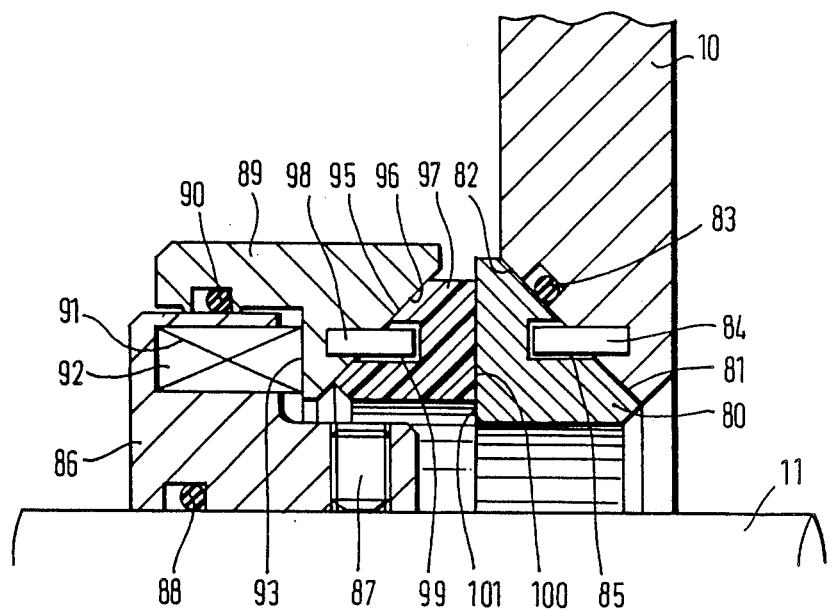
FIG. 4 is a part sectional elevation of an alternative form of seal formed in accordance with the present invention.

In the seal illustrated in FIG. 4, a first seal face member of seat 80 is located with respect to a housing 10, a frustroconical face 81 on the seat 80 engaging corresponding frustroconical face 82 on the housing 10. The seat 80 is sealed with respect to the housing 10 by means of an elastomeric O-ring 83. A plurality of drive pins 84 are located in bores in the housing 10 so that they extend axially and engage in radially extended bores 85 in the seat 80.

A drive ring 86 is secured to a shaft 11 by means of a plurality of angularly spaced clamping screws 87. The drive ring 86 is sealed with respect to the shaft by means of an elastomeric O-ring 88.

An abutment ring 89 is slidingly located on the external diameter of the drive ring 86 and is sealed with respect thereto by means of an elastomeric O-ring 90. Means (not shown), for example a key and key-way between the drive ring 86 and abutment ring 89 is also provided to transmit rotation of the shaft to the abutment ring 89 while permitting axial movement of abutment ring 89. A plurality of compression springs 91 are located in angularly spaced closed bores 92 in the drive ring 86, and act against a shoulder 93 on the internal diameter of abutment ring 89 to urge the abutment ring 89 axially towards the seat 80.

The end face 95 of abutment ring 89 is of frustroconical configuration and abuts a corresponding frustroconical face 96 of a seal face member 97 which is interposed between the abutment ring 89 and seat 80. The faces 95 of abutment ring 89 and 96 of seal face member 97 can be machine finished or lapped to provide a fluid tight seal therebetween. A plurality of drive pins 98 are located in bores in the abutment ring 89 and extend axially into radially extended bores 99 in the seal face member 97, so as to transmit rotational movement from the abutment ring 89 to the seal face member 97 whilst permitting limited relative radial movement therebetween. A radial sealing face 100 at the other end of the seal face member 97 is maintained in sealing engagement with a corresponding radial sealing face 101 on seat 80 by the axial load applied by springs 91.

The radial loads applied to the seat 80 and seal face member 97, as a result of the reaction of the axial load applied by springs 91 at the frustroconical faces 81 and 82 and 95 and 96, ensure that the seat 80 and seal face member 97 remain centralised and provide radial stability.

In the seals described above, the seal face members 31, 31', 70 and 97 engaged by the abutment rings 24, 24', 60 and 89 may constitute wear elements and would be made of softer materials than the other seal face members 12, 65, 66 and 80. For example, in the embodiment illustrated in FIG. 1, the seal face member 31 may be made from graphite, carbon or plastics material and the seat 12 may be made from metal or sintered refractory materials, for example alumina. The seal face members 31, 31', 70 and 97 may however be made of similar or harder materials than the other seal face members 12, 65, 66 and 80. Moreover, replaceable wearing faces may be provided in the seal face members.

In order to facilitate removal and replacement of the seal face members when worn, these members may conveniently be split axially into a plurality of arcuate portions. The seal face members may then be removed and replaced merely by retracting the axially movable components of the seal. Where the seal face member is subjected to an inward radial force applied by the inclined faces, the arcuate portions of the seal face member may be held together by this radial force. Otherwise, the arcuate portions of the seal face members may be held together by clamping rings of tangential bolts.

Similarly, other components of the seals, for example elastomeric O-rings and abutment rings may be split axially to facilitate removal and replacement.

Provided that the sealing faces of the seal face memberes are machined to a reasonable finish, lapping of the faces is not necessary and a running in period could provide a fluid tight seal between the faces. The arrangements described above will also accommodate variations in eccentrics introduced, for example by axial or radial misalignments. However, where it may be necessary to accommodate large misalignments and/or sealing is required from start up, the sealing faces may be made semi-spherical. With this arrangement, the axial alignment of the seal face members may vary considerably while still maintaining full sealing engagement.

With double seals of the type described with reference to FIGS. 2 and 3, the spring rates of the springs 28 acting on the inner and outer seal face members may differ so as to provide differential loading of the inner and outer seal face members. Furthermore the configuration of the axially movable abutment rings and/or seal face members may be varied to adjust their pressure balance and hence the effect of the pressure of the sealed fluid, to provide differential loading on the inner and outer seal face members or to compensate for pressure differentials across the seal.

We claim:

1. A mechanical face seal for providing a fluid tight seal between a pair of relatively rotatable components comprising; a first seal face member mounted in fixed rotational and radial relationship to one of said components and is sealed with respect thereto; abutment means mounted in fixed rotational and radial relationship to the other component and sealed with respect thereto; a second seal face member interposed between the first seal face member and the abutment means; and spring means arranged to apply an axial load between the first and second seal face members; said second seal face member having opposed faces, one of said faces being inclined to the axis of the seal and being maintained in sealing engagement with an oppositely inclined face on the first seal face member under the axial load applied by the spring means so as to impose a radial load on the second seal face member; and the other face being sealed with respect to a corresponding face on said abutment means, means being provided to interconnect said second seal face member rotationally with respect to said abutment means while permitting limited radial movement of the second seal face member relative to the abutment means.

2. A mechanical face seal according to claim 1 in which the inclined faces impose an inward radial load on the second seal face member.

3. A mechanical face seal according to claim 1 in which a plurality of drive pins extend axially from the abutment means into engagement with radially extending bores in a second seal face member.

4. A mechanical face seal according to claim 1 in which one of the abutment means and the first seal face member is slidingly located upon a tubular support and is sealed with respect thereto, spring means acting between the support and one of the abutment means and the first seal face member to urge one of the abutment means and the first seal face member towards the second seal face member.

5. A mechanical face seal according to claim 4 in which a key is mounted on the tubular support member and engages in an axially extending key-way in one of the abutment means and the first seal member to prevent rotation of one of said abutment means and the first seal face member relative to the support member while permitting axial movement thereof.

6. A mechanical face seal according to claim 1 in which the second seal face member is made of a material which is softer than the material used for the first seal face member.

7. A mechanical face seal according to claim 6 in which the second seal face member is made of at least one of graphite, carbon and a plastic material and the first seal face member is made from one of metal and a sintered refractory material.

8. A mechanical face seal according to claim 1 in which at least one of the first and second seal face members are split axially into a plurality of arcuate portions.

9. A mechanical face seal according to claim 1 which the inclined faces are of frustroconical configuration.

10. A mechanical face seal according to claim 1 in which the inclined faces are of semi-spherical configuration.

11. A mechanical face seal comprising a pair of seal assemblies as claimed in claim 1, said seal assemblies being mounted coaxially of one another, between the pair of relatively rotatable components.

12. A mechanical face seal according to claim 11 in which one of the abutment means and first seal face members of the concentric seal assemblies are slidingly mounted and sealed with respect to the internal and external diameters of a tubular support member.

13. A mechanical face seal according to claim 12 in which a plurality of angularly spaced axially extending grooves are provided on the outer surface of one of the abutment means and the first seal face member of the inner seal and the inner surface of the abutment means of the first seal face member of the outer seal, so that when aligned, the grooves will provide locations for a plurality of angularly spaced compression springs which will act between the end of the tubular support member and the closed end of the axially extending grooves, to urge one of the abutment means and the first seal face members towards the second seal face members.

14. A mechanical face seal according to claim 13 in which alternate axially extending grooves in one of the abutment means and the first seal face member of the outer seal assembly and alternate axially extending grooves in one of the abutment means and the first seal face member of the inner seal assembly are of increased length relative to the intermediate grooves, the shorter grooves of one of the abutment means and the first seal face member of the outer seal being aligned with the longer grooves on one of the abutment means and the first seal face member of the inner seal assembly so that adjacent springs will act between the support member and the end of the shorter grooves in one of the inner and the outer seal assemblies.

15. A mechanical face seal according to claim 14 in which the spring rate of the spring means acting upon the inner and outer seal assemblies differ.

16. A mechanical face seal according to claim 11 in which the dimensions of the axially movable components of the inner and outer seal assemblies differ, so that the pressure balance of the inner and outer seal assemblies differ.

17. A mechanical face seal according claim 11 in which an annular chamber is defined between the concentric seal assemblies, a passage being provided to said annular chamber by means of which fluid may be removed from or introduced into the annular chamber.

* * * * *